April 21, 1942.  M. P. WINTHER  2,280,736
AIR CONDITIONING AND LIGHTING SYSTEM FOR VEHICLES
Filed April 11, 1938  8 Sheets-Sheet 1
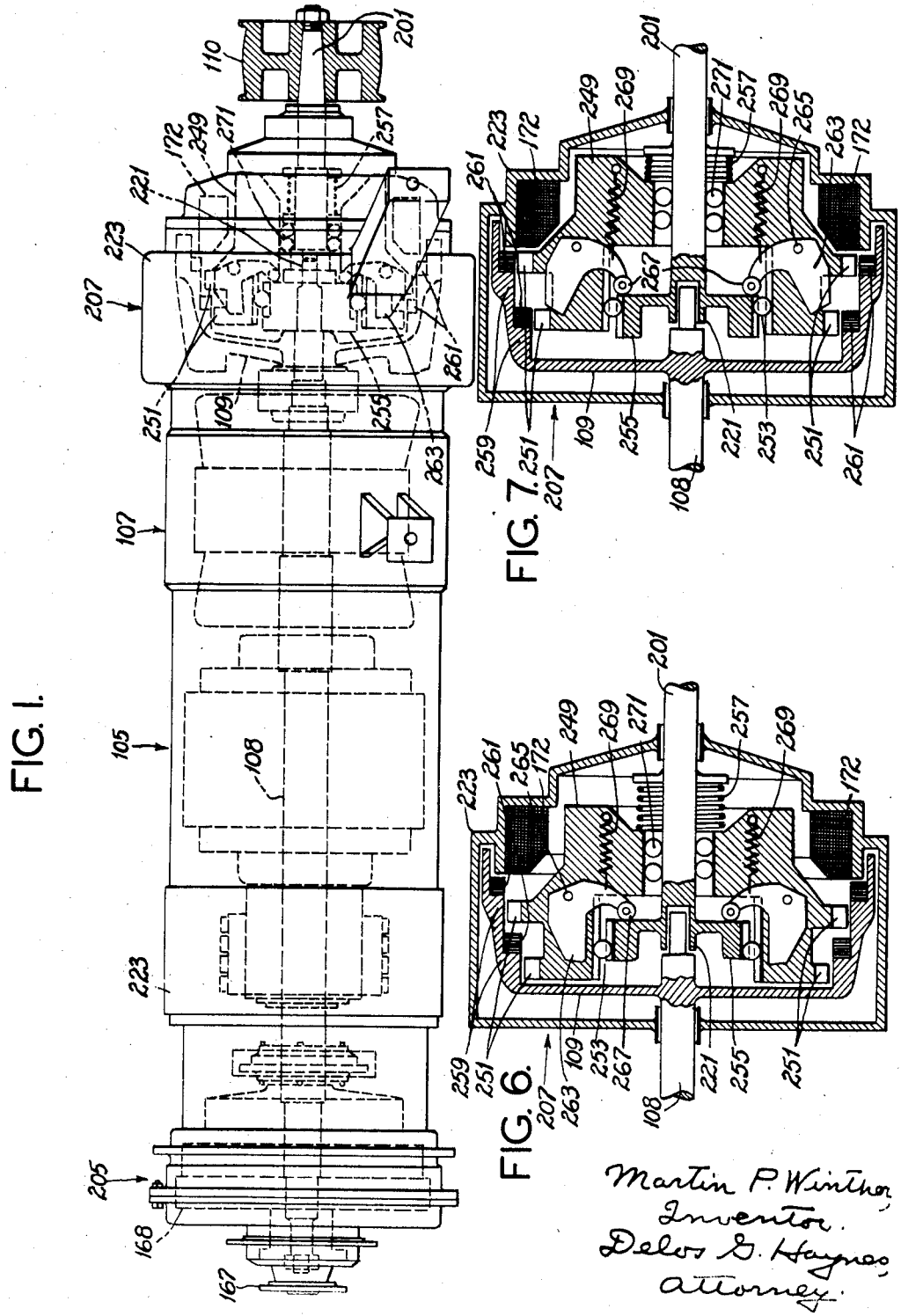

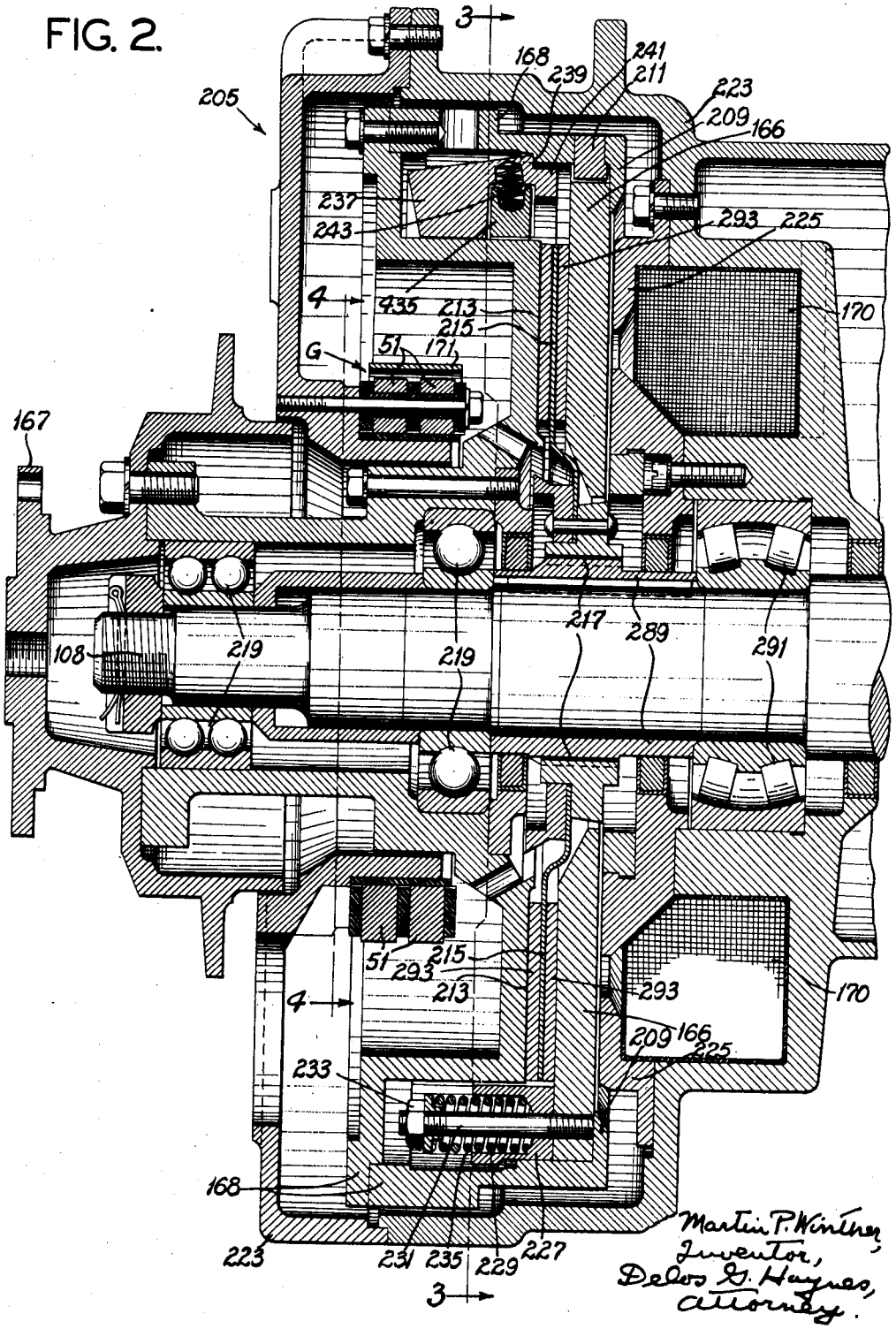

April 21, 1942. M. P. WINTHER 2,280,736
AIR CONDITIONING AND LIGHTING SYSTEM FOR VEHICLES
Filed April 11, 1938   8 Sheets-Sheet 3
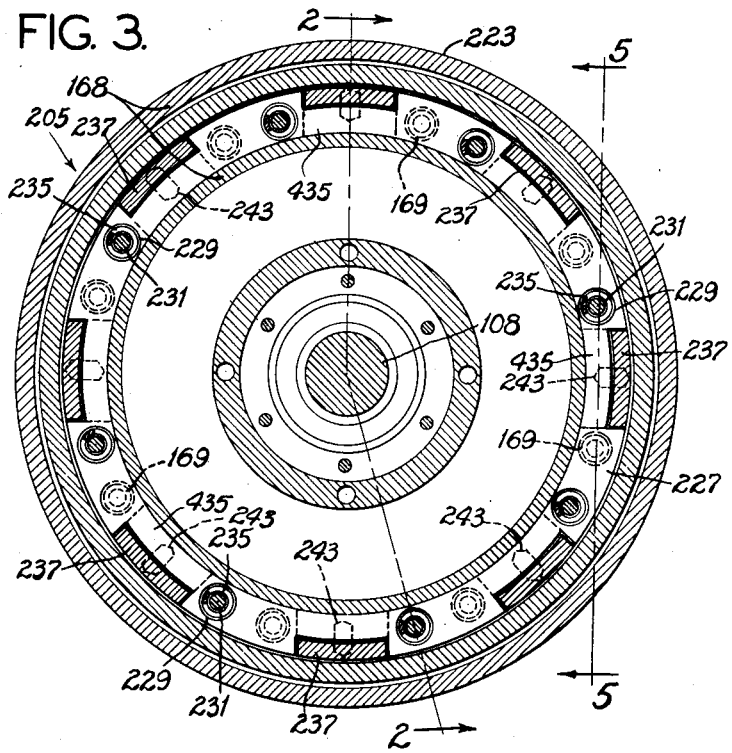
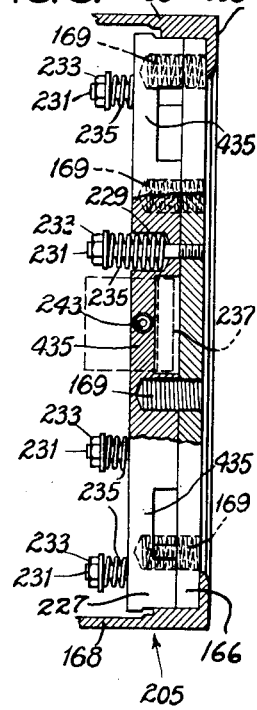
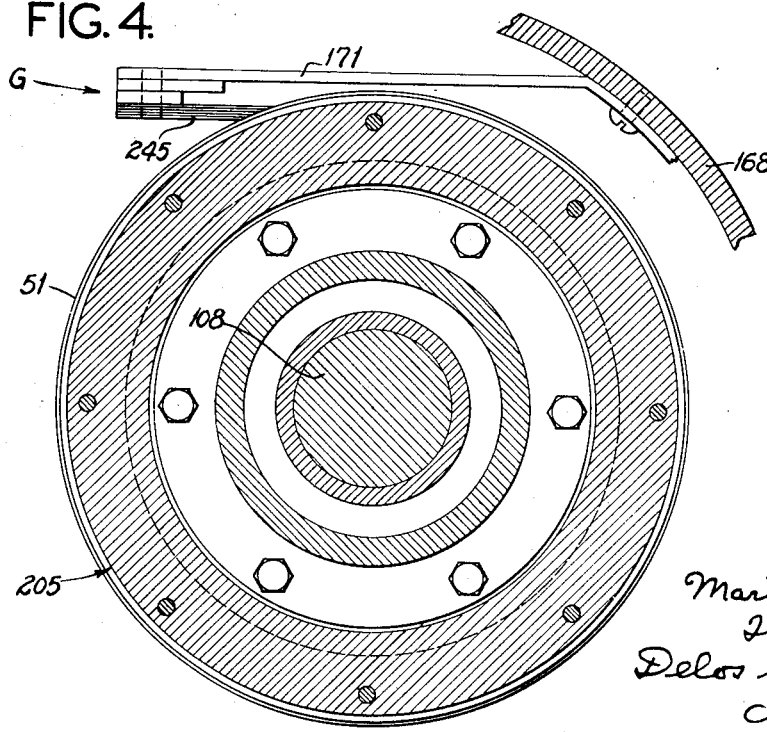
Martin P. Winther,
Inventor.
Delos G. Haynes,
Attorney.

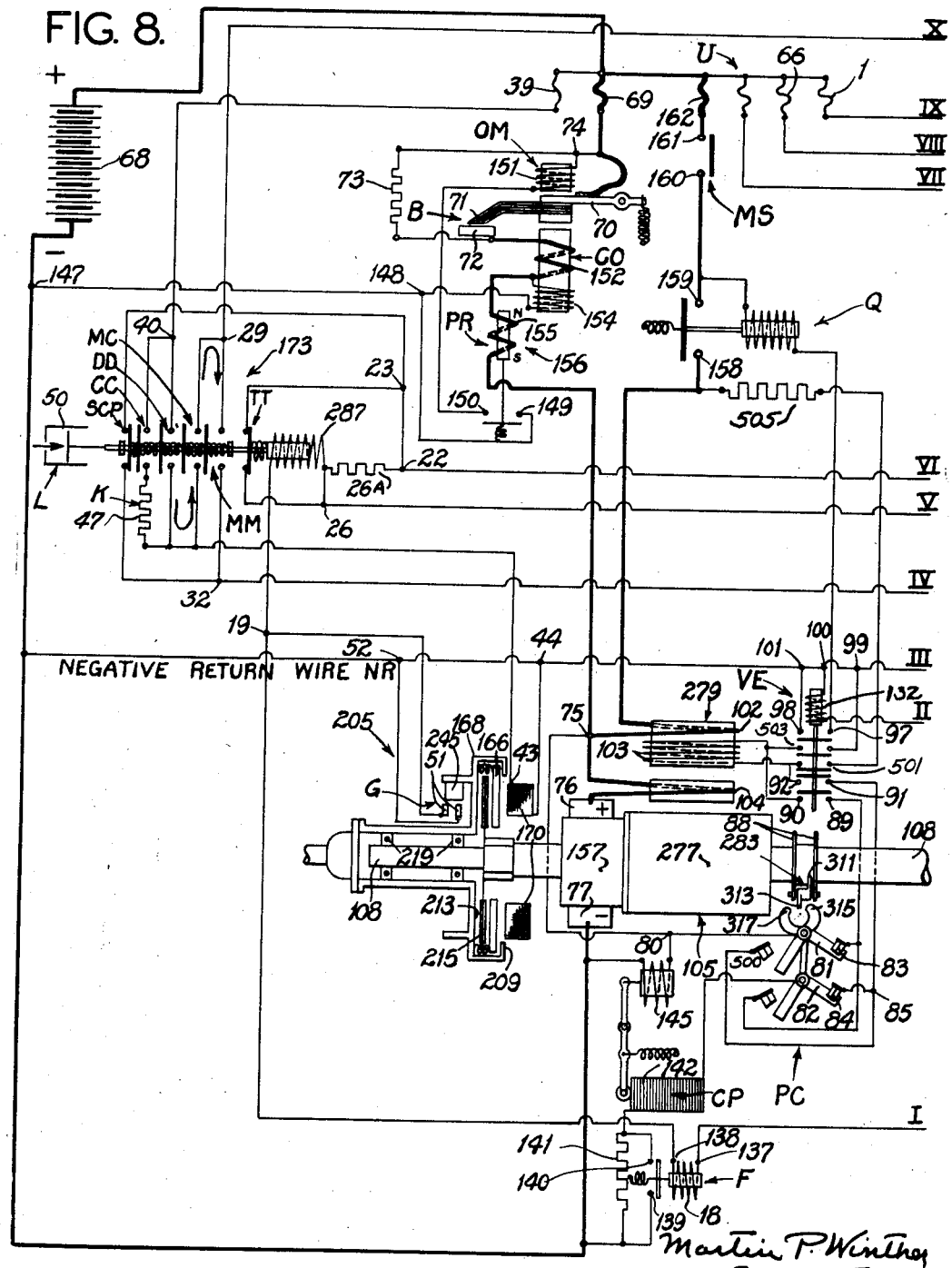

April 21, 1942.　　　M. P. WINTHER　　　2,280,736
AIR CONDITIONING AND LIGHTING SYSTEM FOR VEHICLES
Filed April 11, 1938　　　8 Sheets-Sheet 6

April 21, 1942.   M. P. WINTHER   2,280,736
AIR CONDITIONING AND LIGHTING SYSTEM FOR VEHICLES
Filed April 11, 1938   8 Sheets-Sheet 7

Martin P. Winther,
Inventor,
Delos G. Haynes,
Attorney

April 21, 1942.   M. P. WINTHER   2,280,736
AIR CONDITIONING AND LIGHTING SYSTEM FOR VEHICLES
Filed April 11, 1938   8 Sheets-Sheet 8

Patented Apr. 21, 1942

2,280,736

UNITED STATES PATENT OFFICE 2,280,736

AIR CONDITIONING AND LIGHTING SYSTEM FOR VEHICLES

Martin P. Winther, Waukegan, Ill., assignor to Martin P. Winther, as trustee

Application April 11, 1938, Serial No. 201,336

15 Claims. (Cl. 62—6)

This invention relates to air conditioning and lighting systems for vehicles, and with regard to certain more specific features, to systems of this class for railway passenger cars.

Among the several objects of the invention may be noted the provision of a relatively light-weight, but complete and adequate, lighting and air conditioning unit which is driven from the running gear of the car; the provision of apparatus of the class described, wherein an electric storage battery carried by the car may be charged by operating a D. C. generator from outside, standby, A. C. lines when the car is stationary, whether or not the air conditioning equipment is in operation; the provision of apparatus of the class described wherein standby cooling is available either from the battery as a source of energy, or from the outside A. C. power line; the provision of apparatus of the class described in which battery charging is automatically adjusted to conform to the power available from the A. C. motor; and the provision of apparatus of this class in which starting or stopping of both D. C. and A. C. standby motors is accomplished while these are unloaded, so as to reduce the number of switch-contact failures. Other objects will be in part obvious and in part pointed out hereinafter.

The invention accordingly comprises the elements and combinations of elements, features of construction, and arrangements of parts which will be exemplified in the structures hereinafter described, and the scope of the appplication of which will be indicated in the following claims.

In the accompanying drawings, in which is illustrated one of various possible embodiments of the invention;

Fig. 1 is a side elevation of the rotary driving appartus of the invention;

Fig. 2 is an enlarged, longitudinal section of a magnetic clutch 205, shown at the left of Fig. 1, the section being taken on line 2—2 of Fig. 3;

Fig. 3 is a cross section taken on line 3—3 of Fig. 2.

Fig. 4 is a cross section taken on line 4—4 of Fig. 2.

Fig. 5 is a fragmentary vertical section taken approximately on line 5—5 of Fig. 3;

Fig. 6 is a diagrammatic, longitudinal section of the speed-control drive shown at 207 in Fig. 1;

Fig. 7 is a view similar to Fig. 6 showing the drive in an alternative position;

Fig. 8 is a portion of a wiring diagram illustrating the invention, wherein the ten Roman numerals indicate the connections to be made between Figs. 8 and 9;

Similar reference characters indicate corresponding parts throughout the several views of the drawings.

*Introduction*

Figure 9:
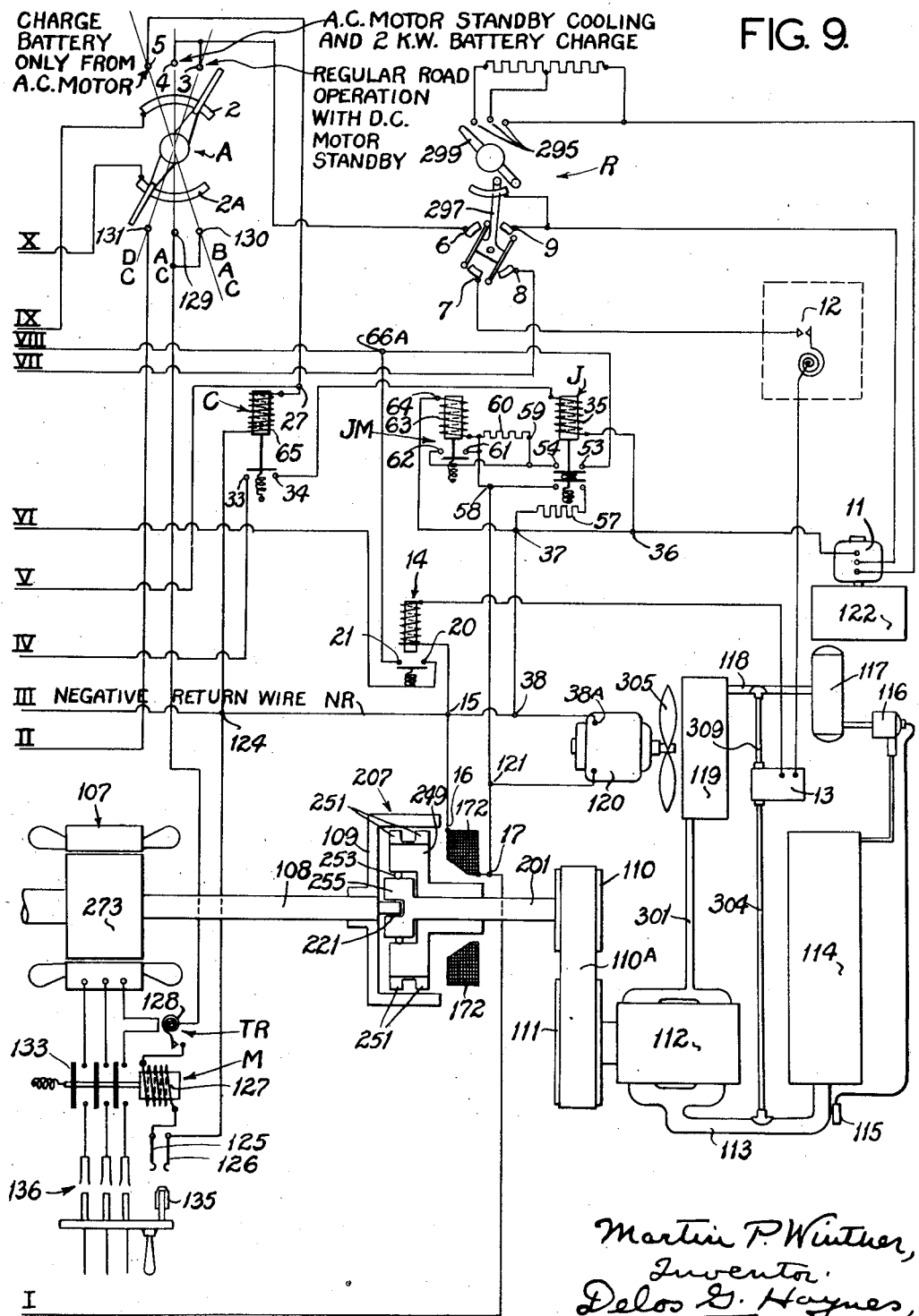
Fig. 9 is a continuation of the wiring diagram of Fig. 8, wherein the ten Roman numerals again indicate the connections to be made between Figs. 8 and 9.

The driving apparatus shown in Fig. 1 is suitably mounted upon a vehicle such as a railway passenger car, and is driven at flange 167 from a positive gear or like drive associated with one of the live axles of the car. When the car moves, the flange 167 is driven at a rate proportional to car speed.

The driven shaft 201 of the driving apparatus is connected by pulleys 110, 111 and belt 110—A (Figs. 1 and 9) with the compressor 112 of air conditioning apparatus carried on the car.

The driving apparatus shown in Fig. 1 which is between the driving flange 167 and the driven shaft 201 includes an electromagnetic clutch 205, D. C. generator-motor 105, A. C. motor 107, and a speed control or slip clutch 207.

A car lighting battery is shown at 68 (Fig. 8), the charging of which is the purpose of the generator component of the D. C. generator-motor 105. The battery 68 also provides D. C. current to operate, when necessary, the motor component of the D. C. generator-motor 105. The main circuit between battery 68 and the D. C. generator-motor 105 is shown in heavy lines in Fig. 8.

Figure 13:
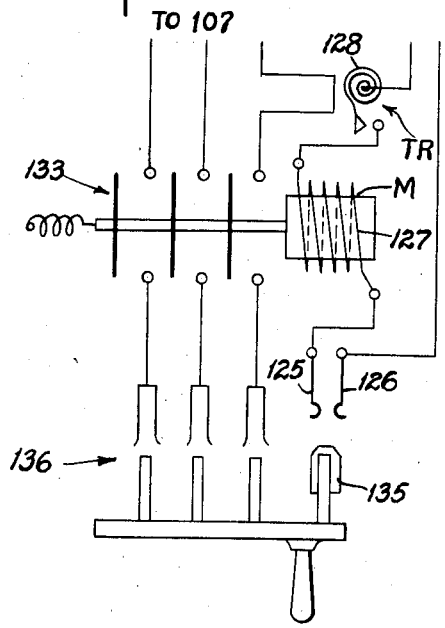
Fig. 13 is an enlarged diagrammatic view of the appurtenances of A. C. motor 107; and, Fig. 14 is a left-side elevation of the switch parts shown in Fig. 10, the shaft and pawl portions at the left of Fig. 10 having been removed.

The A. C. motor 107 is energized from an outside 220 volt, three-phase, 60 cycle supply circuit at railway terminals, yards, and the like, in a manner to be described. A plug 136 is used for this purpose (Figs. 9 and 13).

The armatures of generator-motor 105 and of motor 107 are carried by an intermediate shaft 108. Shaft 108 is capable, under certain conditions, of relative rotation, both with respect to flange 167 and pulley 110, as will appear. This shaft 108 may also be coupled to flange 167 by clutch 205, in order that it may be used to drive the compressor 112 through the speed control unit 207.

There are three primary operations to be accomplished, besides car lighting when required, namely:

1. Road air conditioning, that is, with the train in motion at any speed, or at rest at a station or the like where no A. C. plug-in service is available;
2. A. C. standby service for air conditioning purposes and for battery charging purposes, while the train is at large terminals; and,
3. Battery charging from the A. C. motor at terminals or yards, without air conditioning, whereby is avoided the great expense of purchasing especially generated D. C. current.

Prior to describing how these operations are carried out, the character of each of the primary devices 205, 207, 105, and 107 of Fig. 1, and of other auxiliary apparatus, will be described in sufficient detail.

Clutch 205 (Figs. 1–5)

This clutch is electromagnetic, and comprises a driving drum 168, to which is attached the driving flange 167. The drum is made up of several constituent parts, but, in order to avoid circumlocution, these various parts have been treated as a unit bearing said numeral 168 (see also Fig. 3).

The drum 168 is inwardly flanged, as shown at 209, and carries within the flange a clutch release plate 166. The plate 166 has a splined connection with the drum 168 by the provision of suitable peripheral slots in the plate associated with the pins 211 in the drum. Thus, the release plate 166 may move longitudinally, but it must move angularly with the drum. The plate 166 provides one driving clutch surface.

Opposite the release plate 166 and within drum 168 is a second driving clutch surface 213. Between the clutch surface 213 and the surface of release plate 166 is located a driven clutch disc 215, suitably faced as at 293. The disc 215 is splined at its hub (as at 217) to a fixed collar 289 on intermediate shaft 108. The shaft 108 is piloted by bearings 219 within the drum 168, and at its other end within bearings 221 in the driven shaft 201 (Figs. 1, 6 and 7). The left end of shaft 108 thus supports the rotary drum 168. A bearing 291 supports this end of the shaft 108 in a main stationary case 223.

The clutch is tightly closed by clamping the driven disc 215 tightly between the surface 213 and the plate 166 and loosely closed by loosely clamping said plate 215 between the surface 213 and the plate 166. The mode of effecting the difference will be disclosed in detail.

The clutch is opened by energizing coil 170 which is supported by, and carried within, the stationary case 223 surrounding the clutch. The release plate 166 and the holding plate 225 are magnetic, so that there is an attractive force between them when the coil 170 is energized. The holding plate then draws open the release plate 166 against both tight and loose closure effects.

As forecast above, the clutch is provided with means for producing two degrees of coupling between the drum 168 and the intermediate shaft 108. The normal or moderate degree is effective while the car is standing still, and the higher degree is effective when the car speed exceeds 25 M. P. H. The reason for these two degrees of coupling is that, when a train is standing still, the clutch should not be so securely closed as to prevent slipping. This relieves the shock of acceleration due to switching, coupling of cars, and the like.

Furthermore, no drive is desired nor required until the train speed exceeds 20 M. P. H., and from thence upward until 35 M. P. H. is reached, only about one-half of the full torque is required for the 10 H. P. air conditioning machinery. On the other hand, above 35 M. P. H., full torque is required, at which speed the D. C. generator component of 105 cuts in, in order to charge the car battery 68. Since the lighting generator equipment requires about 15 H. P., the total load above 35 M. P. H. may be of the order of 35 H. P.

Since no torque is required from 0 to 20 M. P. H., and about half the total torque is required from 20 M. P. H. to 35 M. P. H., while full torque is required above 35 M. P. H., it is apparent that, if the total pressure required between the clutch faces for maximum torque were exerted with the train at a standstill, this pressure might be so great as to prevent the necessary clutch slip in order to protect the gears and the like in the positive axle drive during switching and car coupling periods.

The variable coupling effect desired is obtained by employing a clutch spring ring 227 (Figs. 2, 3 and 5) which has holes therethrough with sockets 229 for slidably accommodating studs 231 having heads 233. The sockets accommodate springs 235, which react between said heads 233 and the ring 227. Since the studs 231 are threaded into the release plate 166, the reaction of springs 235 is normally to force the spring ring 227 into engagement with the release plate 166, as shown in Figs. 2 and 5.

In order lightly to thrust the release plate 166 against the driven plate 215, comparatively light-pressure clutch springs 169 are used. These are located in sockets which are formed by openings passing through the release plate 166 and into the spring ring 225 (Fig. 5). Springs 169 are placed in these sockets and react from the flange 209 of drum 168. Thus, the expanding tendency of the light-weight springs 169 is to throw the assembly of the spring ring 227 and release plate 166 to the left (Figs. 2 and 5), so that the plate 166, with the surface 213, clamps plate 215. The springs 235 are stronger than the springs 169, and hence prevent separation of the rings 227 from the plate 166, as long as pressure comes merely from the springs 169.

It is desired to obtain added clutch-closing pressure as the train speed increases to 25 M. P. H. (well below 35 M. P. H., for example), so that when the generator component of 105 cuts in to operate at 35 M. P. H., the total torque needed (sufficient torque to drive both the 10 H. P. air conditioning machinery, as well as the 15 H. P. lighting generator equipment) will certainly be available.

This feature is accomplished by shaping the spring ring 227 with bridge portions 435. These bridge portions are associated with centrifugal weights 237 which are provided with heels 239 pivoting in suitable sockets within the drum 168. Each weight 237 is provided with a contact toe 241, which, when the weight 237 pivots at its heel 239, under the action of centrifugal force, forces the bridge 235 endwise to the left (Fig. 2), and consequently the assembly of spring ring 227 and plate 166 is forced to the left (Fig. 2). Thus, the centrifugal force due to the weights 237 applies force to the spring ring 227, and, as the plate 166 comes against the driven plate 215, the spring ring 227 leaves plate 166 to compress the heavy-pressure springs 235. The reaction of springs 235 applies a greater clutch-closing force, beyond that which is available from the springs 169. In order that the weights 237 will not rattle, springs 243 are held in sockets between them and the bridge portion 235. By this means, the heels 239 are positively kept at their proper positions.

For effecting certain electrical functions to be described, the outer stationary case 223 is provided with circular, stationary rings 51. These form contacts of a centrifugal switch G. The contacting part of the switch G is a brush 245 located on a centrifugally operated flat spring 171. The spring 171 is fastened to the inside of the drum 168 (Fig. 4). The spring 171, with its brush 245 attached, short-circuits the two rings 51 while the train is idle or moving at speeds below 20 M. P. H.

*Speed control 207 (Figs. 6 and 7)*

The multi-speed control 207 is for the purpose of attaining a substantially constant velocity of shaft 201, with varying velocities of the intermediate shaft 108, as determined by varying velocities of flange 167 which receives its motion from the car axle. This control may be generally of the type described in the United States patents of Anthony Winther, Nos. 1,982,461, dated November 27, 1934, and 2,025,487, dated December 24, 1935, or an improved form of those controls, such as described in the United States Patent 2,193,214 of Anthony Winther and myself, dated March 12, 1940, for Electromagnetic control. The basic features of the control of the Patent 2,193,214 are shown in Figs. 6 and 7 herein. These features comprise an inductive driver or armature 109 (driven from shaft 108), which cooperates magnetically with a driven field member 249. Upon member 249 are teeth 251. The inductive driven member 249 has a splined connection (as shown at 253) with a drum 255, which permits the member 249 to move longitudinally on, but to rotate with, drum 255. The drum 255 is connected to the driven shaft 201. Hence, such rotation as is electromagnetically imparted to the driven member 249 is imparted to the driven shaft 201.

A spring 257 normally axially forces the driven member 249 into the position shown in Fig. 6, wherein the flux-concentrating teeth 251 are adjacent homogeneous magnetic regions 259 which favor the production of eddy-currents and a condition of high torque transmission.

On the other hand, when the member 249 is automatically forced, in the manner which will be described, to the position shown in Fig. 7, then the teeth 251 become positioned adjacent laminated-iron regions 261 which do not favor the production of eddy-currents, and thus reducing the proportion of torque transmitted.

The member 249 is moved from the position of Fig. 6 toward the position of Fig. 7 by the action of centrifugal force on weights 263 pivoted to said member 249 at 265. Rollers 267 are on the weights and react against the drum 255, under centrifugal force on the weights 263, to force the member 249 toward the position of Fig. 7. This is done against the reacting tension of springs 269.

Bearings 271 permit the endwise motion needed between the member 249 and the shaft 201, this being done in connection with the endwise motion permitted by the spline bearings 253.

Electromagnetic coil 172 in case 223 provides the magnetic field for effecting the magnetic coupling between teeth 251 and the drum 109. This coupling is varied according to the position of the teeth 251, and the position of the teeth is changed by any incipient speed change of the driven member.

It will thus be seen from the above, and in connection with said Patent 2,193,214, that, with changing speed of the intermediate shaft 208, substantially constant speed conditions of shaft 201 are maintained, variations therein being only incipient. The purpose of this is to insure that the compressor 112 which is driven from the shaft 201 will operate at a substantially constant rate. The compressor 112 provides the load.

*Generator-motor 105 (Figs. 1, 8 and 12)*

The generator-motor 105 has its armature 277 connected to the intermediate shaft 108. Its field is indicated generically at 279 and consists of a series motor winding 102, a shunt generator and motor winding 103, and an interpole series winding 104, all supported on the case 223. Its positive brush is shown at 76 and its negative brush is shown at 77.

Practically the full output rate of the generator component of 105 is made available by driving it from the A. C. standby motor 107 when the air conditioning apparatus is not running, and about 2 k. w. of D. C. current is available when the air conditioning apparatus is functioning. These conditions prevail during A. C. standby service. The reason for this will appear. The device 105 may also be driven by the axle of the car through the clutch 205.

*Pole changer switch PC (Figs. 8, 10, 12 and 14)*

Figure 10:
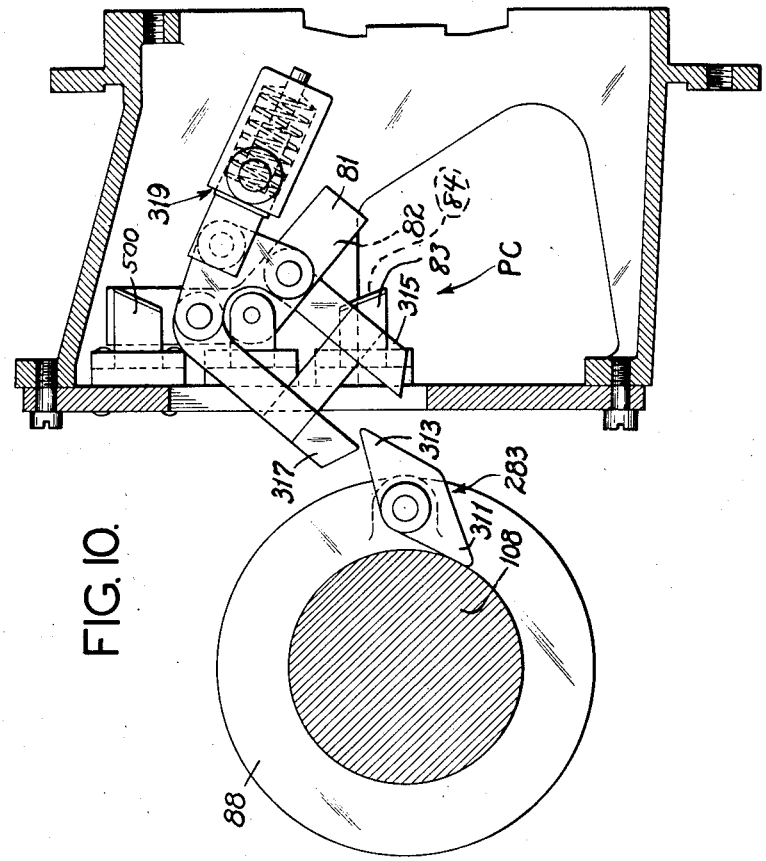
Fig. 10 is a detail end view of a pole changer mechanism, taken substantially on line 10—10 of Fig. 12.
Figure 14:
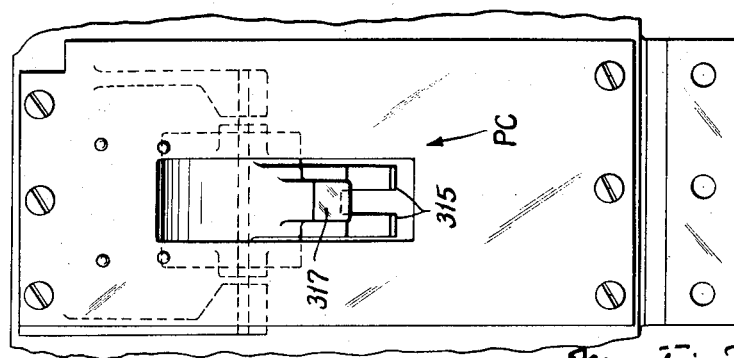
Figure 12:
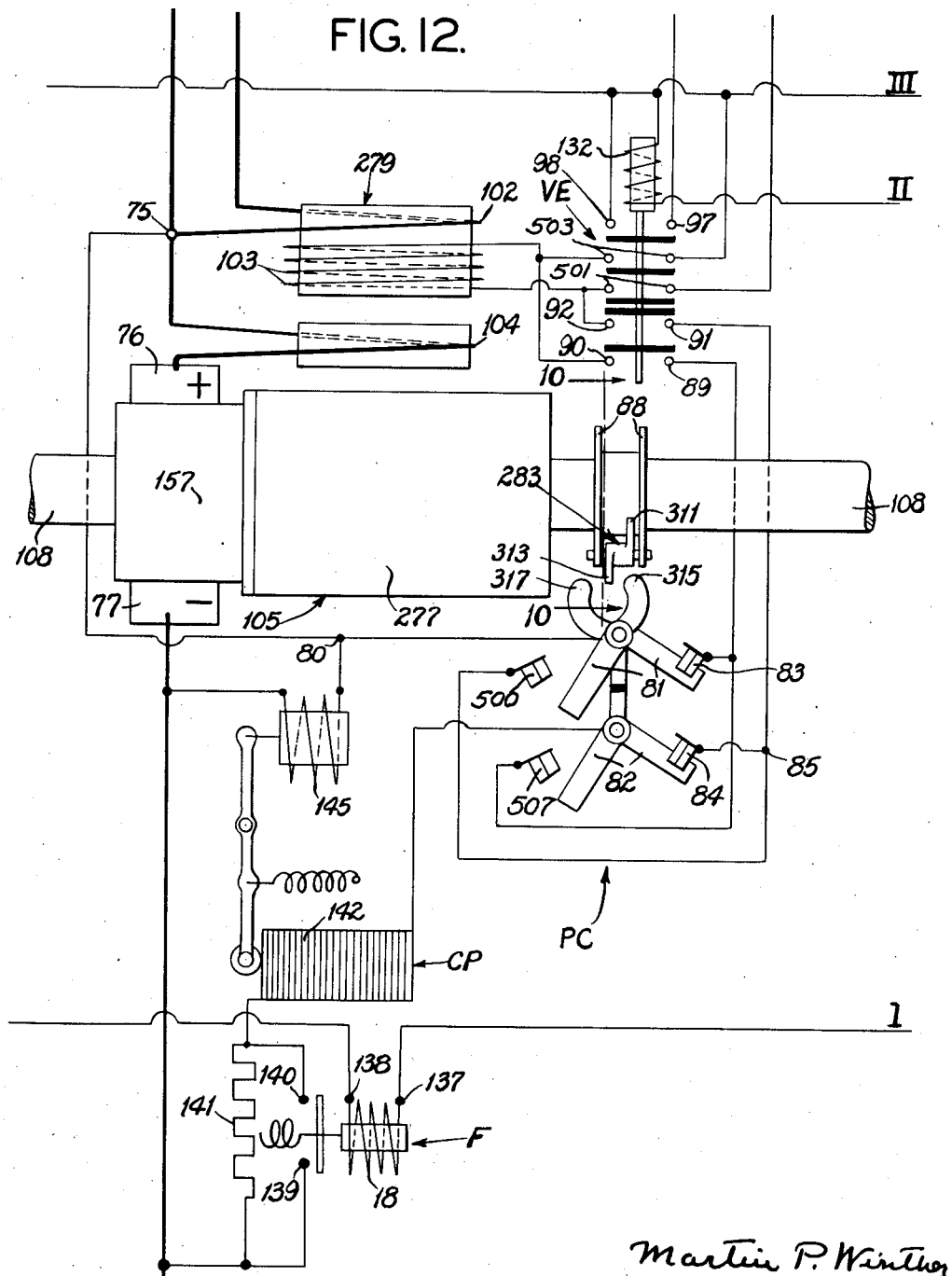
Fig. 12 is an enlarged diagrammmatic view of the generator-motor 105 of Fig. 8, with appurtenances.

Associated with the generator-motor 105 is a known type of pole changer switch PC, the diagrammatic organization of which is shown to the right of the armature 277 in Figs. 8 and 12. Figs. 10 and 14 show further details.

As is known, in the operation of cars provided with axle-driven-generator lighting systems, provision is made for maintaining proper generator polarity, independently of the direction of travel of the car. There are various types of these available, such as ones wherein each generator brush is shifted on the commutator to the center of the next pole when the direction of car motion reverses. In such an arrangement, the brush holders are supported in a rotatable frame which is free to move between well-defined limits in response to the rotation of the armature, the motion being communicated simply by brush friction (see Standard Handbook for Electrical Engineers, F. F. Fowle, fifth edition, section 22, page 288). It is to be understood that such a pole changer, or any other suitable one may be used. if desired.

However, I prefer to use the so-called "Gould" tripper type of this apparatus diagrammatically shown at PC in Figs. 8, 10, 12, and 14, wherein a pawl device 283 having fingers 311 and 313 is pivoted between flange 88 on the intermediate shaft 108. The fingers 311 and 313 cooperate respectively with extension arms 315 and 317 respectively of switch PC. The finger 311 and one extension arm 315 are in one plane, and finger 313 and switch extension 317 are in another plane. In practice, a pair of fingers 311 and arms 315 may be used, but for descriptive purposes, only one finger is discussed. The pawl 283 has its center of gravity outside of its pivot point (Fig. 10), and its form is such that under centrifugal force it is symmetrically arranged with respect to a radial line. Hence, under substantial constant-speed rotation of shaft 108, the fingers 311, 313 are equidistant from the center of rotation, that is, they are drawn in clear of the switch extensions 315 and 317. This eliminates any action on the pole changer switch PC.

But, if for example the car stops, then the double pawl 283 depends by gravity, and is angled with respect to a radial line as the car starts. This is because when it moves upwardly to the right (Fig. 10), the finger 311 rests on the shaft 108, and finger 313 is extended. When it moves upwardly to the left, the finger 313 rests on shaft 108 and finger 311 extends. Either of extending fingers 311 or 313 contacts one of the extensions 315 or 317 respectively of the pole changer switch PC, if that switch is in the wrong position for the assumed direction of car movement. If the switch is already in the correct position, that is, if the car proceeds in the direction it was proceeding before it stopped, then, during the first few revolutions, the fingers 311 or 313 freely pass extensions 315 or 317, respectively, as may happen to be in the way, and finally the pawl 283 assumes its symmetrical position under the action of centrifugal force, in which position neither of its fingers 311 or 313 touch either of the pole changer projections 315 or 317. The switch PC is overcentered by a device 319 so that it tends to hold a preset position.

It will thus be seen that the pole changer switch is set into one position or the other, depending upon the direction of car movement. The electrical functions of this reversal will be discussed hereinafter.

*Automatic charging switch, (Fig. 8)*

Associated with the generator-motor circuit (shown in heavy lines in Fig. 8) is an automatic charging arrangement. This includes a teaser circuit composed of fuse 69, junction 74, resistance 73, contact 72, series winding 152 of generator cut-out CO, coil 155 of polarized relay PR, junctions 75, 80, blade 81 of pole changer PC, clip 83, and point 89 of a motor-field switch VE. If the switch PC is in its other position, the circuit is through clip 500, junction 85 and to point 91 of switch VE. From switch VE connection is made back to the negative side of the battery through switch PC in either of its positions, as is clear from Fig. 12.

One circuit through PC (as shown in Fig. 12), VE (down) and 103 is as follows: 80, 81, 83, 89, 90, 103, 92, 91, 85, 84, 82 to CP. When PC is thrown, the circuit is as follows: 80, 81, 500, 85, 91, 92, 103 (reversing polarity) 90, 89, 507, 82 to CP.

Hence, by reason of pole changer switch PC, the shunt coil 103 of generator-motor 105 is properly excited at the beginning of operation of generator-motor 105 as a generator, points 89, 90, 91 and 92 of switch VE being then closed.

When the voltage of 105 rises with increased train speed sufficiently to permit of connection to the battery 68, the coil 154 of generator cut-out CO receives enough current to pull down the cut-out armature 70, thus completing at points 71, 72 the connection of the generator component of 105 to the battery 68. The series winding 152 acts as an aid after contacts 71, 72 have been closed.

The polarized relay 156 is normally open, as shown, and the current is such as to assist in maintaining the polarity of its permanent magnetic armature.

When the train speed decreases to a point where the voltage generated by 105 drops to such a degree as to permit the battery 68 to discharge through the generator component of 105 in a direction opposite to the charging current, then the polarized relay 156 closes the contacts 149, 150, thus establishing a circuit through junction 74, coil 151 of switch-opening magnet OM, points 150, 149 of polarized relay PR, and junctions 148, 147, to cause magnet OM to exert a powerful pull on the armature 70. A powerful action is often necessary due to the tendency of contact points 71 and 72 of switch B partially to fuse together, and the action is designed to be in the nature of impact corresponding to a blow delivered to armature 70. Thus is precluded the probability of sticking of the contacts 71 and 72 due to the heavy current handled when the generator voltage drops below the charging requirements. Many failures of existing electromagnetic systems are due to the automatic switch sticking and the battery subsequently discharging into the generator as the train slows its speed.

The generator component of the generator-motor 105 must always deliver positive current through the brush 76. When the direction of rotation is changed, it is therefore necessary to reverse the polarity of its field. This is accomplished by the teaser circuit 69, 74, 73, 72, 152, 155, 75, 80, working in conjunction with the pole changer switch PC and field switch VE as already made clear.

*Alternating-current motor 107 (Figs. 1, 9, and 13)*

The auxiliary A. C. motor 107 has its armature 273 fast on the intermediate shaft 108 (Fig. 9), and its field 275 is stationary in the case 223 (Fig. 1). A. C. 3-phase, 220 volt, 60 cycle current is supplied when available at plug 136. Contact 135 closes points 125, 126 in circuit with an operating coil 127 of an A. C. switch 133. This coil 127 is connected in series with a thermal protective relay 128. The coil 127 and relay 128 are connected across the main line of battery 68 at a suitable setting of a control switch A, as will appear.

*Air conditioning apparatus*

This includes the compressor 112 having the usual suction line 113. The compressor compresses to the condenser 119 over pressure line 301. The condenser 119 is cooled by a fan 305 driven by a motor 120.

From the condenser 119 liquid passes over line 118 to the receiver 117. Liquid is expanded into the evaporator 114 through an expansion valve 116. The valve 116 is responsive to conditions of a thermal bulb 115.

At 13 is shown a high- and low-pressure, cut-out switch on the refrigeration line which is in series with an electric thermostat 12.

This switch responds to fluid pressure drop over the lines 309, 304. Whenever the pressure drop over lines 309, 304 is dangerously high or dangerously low, the switch 13 opens so as to reopen the pilot circuit which the thermostat 12 closes. The thermostat 12 closes in response to too high a temperature in the vehicle and calls for refrigeration. Therefore, if the refrigerating apparatus is in a dangerous condition from the viewpoint of pressure of too high or too low a value occurring, the switch 13 will prevent the thermostat 12 from starting up the air conditioning apparatus. An example of a fault that might occur with the refrigerating apparatus would be sticking of the expansion valve 116 or failure of the operation of fan 305, both of which would cause excessively high pressure. Various causes for excessively low pressure are obvious to those skilled in this art.

An air circulating blower is shown at 122 driven by a motor 11.

Figure 11:
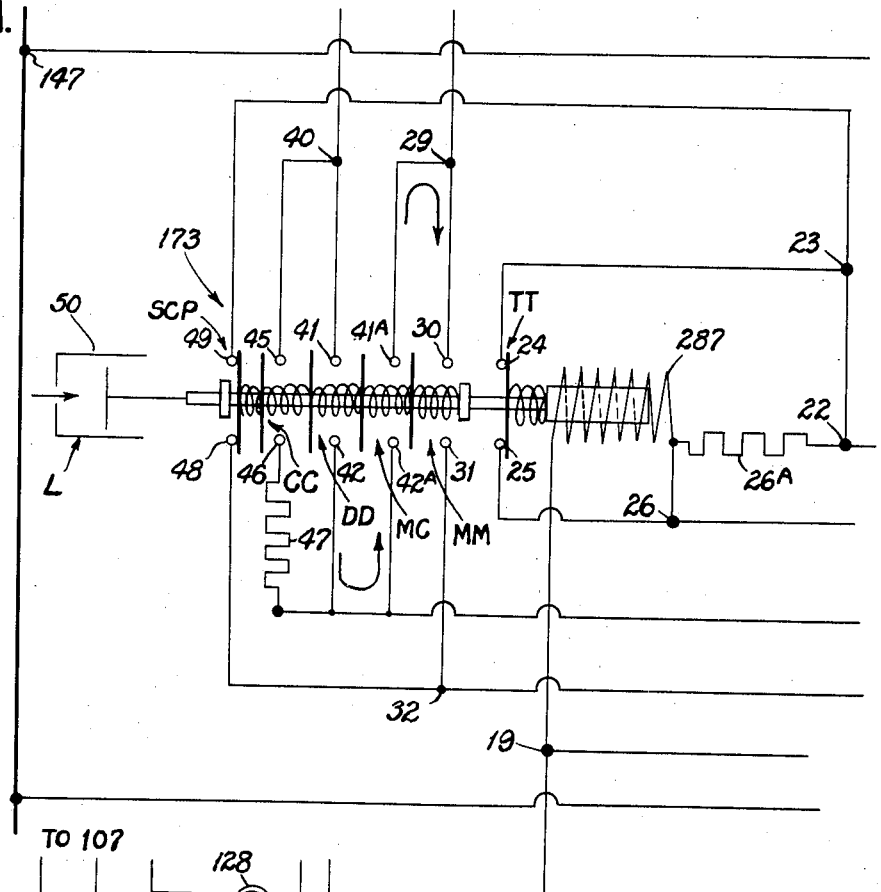
Fig. 11 is an enlarged diagrammatic view of the sequence switch 173 of Fig. 8.

Sequence switch 173 (Figs. 8 and 11)

This control switch is operated by a coil 287 and is controlled as to speed of travel by a damping mechanism 50.

The switch (which is diagrammatically illustrated) preferably comprises six mercury tubes actuated by a rotary shaft. When the coil 287 is energized, the shaft actuating the six switches is operated slowly, due to the damping effect of the bellows L, and switches CC, DD, MC, MM and TT are operated in the sequence stated. However, switch SCP opens before any of CC, DD, MC or MM close, as coil 287 is energized, and it also closes after the others have all reopened after deenergization of said coil 287. Switch SCP provides for operation of the speed control 207 during road speeds above 20 M. P. H., as will appear. Switches DD, MC, and MM are fed in cascade, as indicated by arrows on the diagram. Thus, the first one closed feeds current to the next.

Switch CC is in shunt with switch DD, and because of the resistance 47, causes a slow opening action of the pressure plate 166 of the magnetic clutch 205 (Fig. 2), the coil 170 being in series with the resistance 47 and the switch CC. They are all across the line, as will be particularized.

The functions performed by the various switch contacts are as follows:

Contacts 24 and 25 of switch TT remain in contact until the end of the stroke, and then open, and are the first ones to re-establish contact.

Contacts 48 and 49 of switch SCP are normally closed, as are contacts 24 and 25 of switch TT.

When the switch 173 begins to move, contacts 48, 49 of switch SCP break first.

Contacts 45 and 46 of switch CC are the next to make contact, to energize coil 170 of the clutch 205, so as to start a slow opening of the clutch, because of resistance 47, and to prevent sudden closing during the reverse action.

Closure of contacts 41 and 42 of switch DD follows to complete the opening of the clutch, the resistance 47 at this time being shunted out of circuit.

Contacts 41A and 42A of switch MC are next closed and serve to operate the motor-field switch 132, the detailed connections for which will be described.

Contacts 30 and 31 of switch MM are next to close and serve to energize the speed-control coil 172 in the speed control 207.

Contacts 24 and 25 when open insert an economizer resistor 26A into circuit with the coil 287 of the sequence switch 173.

Blower motor interlock switch R (Fig. 9)

This switch R determines the air circulation to be brought about by means of blower 122 operated from motor 11 (Fig. 9). Unless arm 299 of switch R is set on one of the three available contacts 295 for determining the operation and speed of the blower motor 11, the circuit through points 6, 7 and thermostat 12 is dead and no air conditioning can take place.

Points 8 and 9 serve other functions to be clarified.

Selector control switch A (Fig. 9)

This switch may be manually set to any one of three positions, DC, AC, or BAC, to determine various pilot circuits.

When set to position DC, it selects for operation of relays which provide D. C. standby operation below 20 M. P. H. and direct drive to the compressor 112 above 20 M. P. H.

Switch A is set to position AC whenever A. C. current is available to the plug 136, under which circumstances, the apparatus is set for A. C. powered, standby service.

When the switch A is set at position BAC, it so controls the pilot circuits that the generator may give a full output.

Charging rate relay switch F (Figs. 8 and 12)

The relay F controls the charging rate of the generator component of the generator-motor 105 by shunting out resistance when the compressor 112 is not running during operation of the A. C. motor 107.

When the compressor 112 is running during operation of the A. C. motor 107, there are available only three to four H. P. in the motor 107 for use in driving the generator component of the generator-motor 105. Then the switch F is open and resistance 141 weakens the generator field to the proper value for a lower generator output.

Both coil 170 of the clutch 205, and coil 172 of the speed control 207, are required to be energized before the switch F will open to introduce resistance 141 into the field circuit of the generator. Thus, it is the function of the relay switch F to insert the resistance 141 into the shunt field of the generator when the A. C. air conditioning standby service is being used. Since refrigeration work is being done by driving the compressor 112 by means of the A. C. motor 107, some battery charging can be done with the generator component of the generator-motor 105, but the output is limited by the resistance 141 so as not to overload the A. C. motor 107.

Field Switch VE

The purpose of this switch is to function, through its points 97, 98, as a relay for the motor switch Q; to effect proper circuit connections for motor or generator operations, as desired, of 105; and to function in association with the pole changer switch PC and the shunt winding 103 to provide correct polarity of winding 103 when 105 functions as a generator.

Relay switches JM and J (Fig. 9)

Relay switches JM and J start the compressor 112 and the condenser fan motor 120 after the standby motor 107 is up to full speed. Relay switch JM closes about three seconds after relay switch J, thus giving an easy start to the compressor 112 through the speed control 207.

Relay J is a field-discharge relay for establishing a circuit to the fan motor 120 and the speed-control coil 172 in the speed control 207. Numeral 57 indicates a field-discharge resistance.

The relay JM is associated with the relay J. Due to the characteristic of rapidly picking up full load which is inherent in the speed control 207, the time being only about one second, it is advisable to have a time-delaying device in the circuit. Most time-delaying switches are of complex structure, but the new arrangement here described is novel in its simplicity.

When the relay J is energized, contacts 53 and 54 are closed, thus establishing a circuit through fuse 66, junction 66A, points 53, 54, junction 59, resistance 60, junctions 58, 121, 17, coil 172 of speed control 207, and junctions 16, 15 to the negative return wire NR. This circuit also passes to the contact 38A and through the motor 120. The relay JM is then still open, for the reason that the condenser fan motor 120 is provided with a low reactance when starting Therefore, the current drawn is large and there is little voltage drop through the coil of relay JM. The fan motor 120 offers a very low resistance.

However, as the fan motor builds up its speed, the reactance of the motor (counter electromotive force) rises, so that sufficient voltage is built up across the points 61 and 37 to cause enough current to flow through relay JM to close the contacts 61 and 62, thus cutting out the resistor 60 and supplying full excitation to the coil 172 in the speed control 207. By this means, a time-delay feature for the progressive excitation of coil 172 is obtained, simply by making use of certain inherent characteristics of a piece of apparatus required anyway, that is, of motor 120.

An important reason for desiring a gradual pick-up or loading by the speed control 207 is that this system is intended to be used with a positive gear drive on the car axle (as above made clear). If the speed control has the characteristic of picking up the load quickly, it is necessary particularly at high train speeds, to relieve the shock which might otherwise be put upon the gear train. This is done by this gradual pick-up or loading means. This first provides a driving ratio between the load and the driving motor which is less than the normal driving ratio, and which later is increased to the normal operating ratio.

*Detailed description of operation*

First will be described the conditions for road air conditioning. By this is meant continuous air conditioning service while the train is enroute and away from the main terminal, whether or not the train is in motion, but where A. C. plug-in service is not available at plug 136.

The normal state of the apparatus is one wherein the clutch 205 is closed by its low-pressure springs 169 (Fig. 5). Hence it drives shaft 108 according to train speed. This clutch may be opened by the energization of its coil 170. It is centrifugally more tightly closed at train speeds above 25 M. P. H. This clutch completes the drive connection between the car axle through the shaft 108, thus rotating the armatures of the generator-motor 105 and the motor 107, and the drum 109 of speed control 207.

The speed control 207 starts out in the position shown in Fig. 6 and progresses toward the position shown in Fig. 7 as speed of shaft 108 increases, but maintains shaft 201 at about a constant speed at variable speeds of shaft 108.

*Operation at speeds below 20 M. P. H.*

Selector switch A is set at position DC, and switch R is set at a point suitable 295 for energizing the blower motor 11.

Whenever the thermostat 12 (which responds to car temperature) closes, thus calling for cooling, a circuit is established starting with the fuse block 1 of the terminal U on the plus side of the battery 68. From here the circuit progresses through plate 2 and point 3 of switch A, points 6 and 7 of the then closed interlock switch R, closed thermostat 12, switch 13, relay 14, and connection 15 on the common negative return wire NR.

When the relay 14 closes, the following circuit is established: Fuse block 66 on bus bar U, 66A, points 21 and 20 on relay 14, junctions 22 and 23, points 24 and 25 on sequence switch 173 junction 26, coil 287, junction 19, clutch switch G and junction 52 on the common negative return wire NR. It will be understood that the brush 245 of switch G opens the circuit through the slip rings 51 only at speeds above 20 M. P .H., and below these speeds the circuit remains closed.

The result is that in starting from zero velocity the circuit last traced results in energization of the sequence switch 173. This causes points 48 and 49 thereof to break first. Then points 45 and 46 are connected, and this establishes a circuit through fuse block 39, junction 40, points 45 and 46, resistor 47 (which slows down the electromagnetic opening action of clutch 205), junction 43, coil 170, and junction 44 on the common negative return wire NR. Thus the clutch 205 is slowly opened followed by the closing of points 41 and 42 on sequence switch 173, whereupon the clutch 205 is fully opened.

Next, the points 41A and 42A of the sequence switch 173 close to send current through junction 29 to the plate 2A of the manual control switch A. This establishes the following circuit: Fuse block 39, junction 40, points 41 and 42, points 42A and 41A, junction 29, plate 2A, point 131, coil 132 of motor-field switch VE, and junction 100 on the negative return wire NR.

Thus, switch VE is energized, and among others, its points 97 and 98 are closed thus energizing the motor switch Q. This is accomplished by the circuit constituted by fuse block 162 (on bus bar U), points 161 and 160 of a manual cutoff switch MS, points 159 and 158 of the motor switch Q, winding 102, junction 75, winding 104, brush 76, commutator 157, brush 77, and junction 78 which is on the negative side of the main battery circuit. This circuit starts the motor component of generator-motor 105 from battery 68 and revolves shaft 108 and hence the drum 109 of the speed control 207. Thus there is fast-acting means for starting the motor before clutch 207 is energized or actuated, which may be called a quick-make relay for starting the motor.

At this time, points 501, 503 of the switch VE are closed and the shunt field 103 becomes energized in the direction for operation as a motor. The circuit is from point 158, through shunt field resistor 505, points 501 of switch VE, shunt field 103, points 503 of switch VE and junction 99.

By this time, the points 30 and 31 of the sequence switch 173 have closed. These points establish a circuit as follows: Fuse 39, junction 40, points 41 and 42, points 42A and 41A, junction 29, points 30 and 31, junction 32, points 33 and 34 of the pilot relay C for battery charging, coil 35 of the first-clutch relay J, junction 36, junction 37 and junction 38 on the negative return wire NR. This has the effect of energizing the relay J and of closing the following circuit: Fuse 66, junction 66A, points 53 and 54 of relay J, junction 59, resistance 60, junction 58, junction 17, coil 172 of the speed control 207, and junction 15 on the negative return wire NR. The resistance 60 has the effect of causing the speed control 207 slowly to accelerate the driven shaft 201. Thus power is transmitted from the shaft 108 to the compressor 112, through the slowly accelerating shaft 201. There is time-delay between energization of control clutch 207 and energization of the motor component of 105.

At the same time, the fan motor 120 receives current through points 53, 54, junction 59, resistance 60, junction 58, junction 121, motor 120, the current returning to the negative return wire at junction 38. Due to the low armature reactance (low counterelectromotive force), most of the voltage drop in this circuit occurs between the junctions 58 and 59, that is, through the resistor 60. When, however, the motor 120 attains full speed, its counterelectromotive force raises the potential between junctions 37 and 64 on the one hand, and junction 58 on the other hand, so that sufficient current flows through coil 63 of the relay JM to operate that relay. This in turn closes the points 61, 62 of the second clutch relay JM and the resistor 60 is shunted out of circuit and full current is applied to the speed control coil 172 and the motor 120.

Thus, the speed control 207 and the motor 120 come up to full speed with time delay. This permits the load of the compressor 112 to be assumed smoothly.

The above completes the connections necessary to establish operation of the air conditioning equipment from the D. C. motor component of 105 at speeds below 20 M. P. H., or with the train standing still and after having left the main terminals where the A. C. current for operating the A. C. motor 107 is not available.

*Operation at train speeds above 20 M. P. H.*

When the train reaches or exceeds a speed of 20 M. P. H., the centrifugal switch G in the clutch 205 opens contact between the brush 245 and slip rings 51, thus de-energizing the sequence switch 173. The contacts of the switch 173 break in reverse order, so that sequence of operations is as follows, so far as the power units are concerned:

The speed control 207 has its coil 172 de-energized, thus dropping the load from the motor component of generator-motor 105.

At the same time, the fan motor 120 is cut off.

Due to de-energization of the coil 132 of switch VE and openings of its points 97 and 98, the circuit for the switch Q is broken, thus opening its points 158 and 159. This breaks the energizing circuit of the motor component of the generator-motor 105.

Coil 170 of the clutch 205 is de-energized, thus permitting the clutch plate 166 to close. The shaft 108 is then driven by power from the car axle, and the drum 109 of the speed control 207 is thus mechanically operated or driven.

The points 48 and 49 of the sequence switch 173 again close, thus again energizing the coil 172 of the speed control 207 and resulting in driving of the compressor 112.

Thus regular direct mechanical air conditioning is re-estalished under road conditions at speeds above 20 M. P. H.

*Road battery charging*

A special feature of the clutch 205 pertains to the charging of the battery 68 by means of the generator component of generator-motor 105. The operation of this feature is as follows:

Since the clutch 205 is to transmit sufficient mechanical power to drive both the air conditioning compressor 112 and the generator component of the generator-motor 105, its extra-pressure, centrifugal weights 237 (Fig. 2) exert the required pressure when the train reaches 25 M. P. H. The points 158 and 159 of the switch Q are open at this time, as above made clear.

With control switch A still set at DC, as above stated, the following circuit is established, which includes the teaser circuit for the generator field, this circuit being as follows: Fuse 69, junction 14, resistance 73, contact 72, series winding 152 of the generator cutout CO, series winding 155 of polarized relay PR, junction 75, junction 80, blade 81 of switch PC, clip 83 of switch PC, points 89 and 90 of switch VE, shunt winding 103 of the generator-motor 105, points 92 and 91 of motor field switch VE, junction 85 of switch PC, clip 84 of pole changer PC, blade 82 of switch PC, carbon pile variable resistor CP, points 140 and 139, to the negative side of the battery circuit. This results in energizing the shunt winding 103 in the proper direction.

The generator of 105 builds up potential, and as the train reaches about 35 M. P. H., the shunt coil 154 leading from winding 152 on the cut-out CO to the negative side of the battery 68, attains a current value enough to close the points 71 and 72, thus completing closure of the generator circuit for generator action.

Operating coil 145 of a voltage regulator operates the carbon pile 142 to regulate the current through the shunt coil 103. At this time the series motor winding 102 on the generator-motor 105 is not in circuit, because of the open condition of the points 158 and 159 on switch Q.

The switch PC directs current through shunt winding 103, so as to set up the proper polarity for battery charging in accordance with the direction of train movement.

*Alternating-current standby service*

While, at large depots or terminals, where A. C. power is available at the plug 136, the operation is as follows:

The control switch A is placed at position AC. The blower motor switch R is set so as to operate the blower motor 11 in the manner already described.

The plug 136 is in connected position.

When the thermostat 12 closes, circuit is established as above described through 1, 2, 4, 6, 7, 12, 13, 14 and 15. This also closes the switch in connection with relay 14, thus establishing the circuit through 66, 66A, 21, 20, 22, 23, 24, 25, and 26, coil 287, 19, switch G in the clutch 205 (closed below 20 M. P. H.) and 52.

This again energizes switch 173 so that points 48, 49 break first, then points 45 and 46 are connected, establishing a circuit through 39, 40, 45, 46, 47, 43 and 44. This latter circuit energizes the coil 170 through resistance 47, thus again slowly opening the clutch 205. This is again followed by the making of contacts 41, 42 which causes the clutch 205 fully to open. Then points 41A, 42A close to energize plate 2A of control switch A and again establish a circuit through 39, 40, 41, 42, 42A, 41A, 29, 2A, 129, point 128, coil 127 of thermal protection relay TR, coil 127, points 126, 125 (plug 136 in) to junction 124 on the negative return NR.

Point 131 of the control switch A is not at this time connected, and therefore the D. C. motor component of the generator-motor 105 receives no current.

However, the operating coil on the A. C. motor 107 is energized as particularized through thermal protection relay TR.

The clutch 205 has at this time been opened as above described, and shaft 108 is free to rotate independently of the road wheels of the vehicle.

The coil 287 of the sequence switch 173 having been fully energized has cut in the coil 172 of the speed control 207, so that the compressor 112 is operated after the motor 107 has attained its speed.

It should be noted that, under these conditions, the generator-motor 105 can also supply direct current to the battery 68. While the A. C. motor 107 is operating the compressor 112, as described, circuit is also established through terminal 17 of the speed control coil 172, point 137 on the charging rate relay F, coil 18 of F, point 138, junction 19, closed switch G in stationary clutch 205, and junction 52 on the negative return wire NR. This energizes the coil 18, and opens points 139 and 140 so as to insert the resistance 141, and reduces the output of the generator-motor 105 to a degree commensurate with the power available from the A. C. motor 107. This output is used for battery charging in excess of the power used by the compressor 112.

*Battery charging only at a car terminal*

For this purpose, the switch A is set at position BAC, the switch 136 being still plugged in.

Circuit is established through fuse 1, plate 2 on switch A, point 5, junction 27, coil 65, and junction 124 on the negative return wire NR. This opens points 33, 34 of battery charging relay C, and effects de-energization of the coil 172 of the speed control 207. Hence the air conditioning equipment becomes inoperative. Thus the energy which would flow to the compressor is available for battery charging purposes.

Then circuit is established through fuse 1, plate 2, point 5, junction 27, junction 26, coil 287 of sequence switch 173, junction 19, switch G of stationary clutch 205, and junction 52 on the negative return wire. The sequence switch 173 being thus energized, the clutch 205 is held open.

Ultimately, when the points 41, 42, 42A and 41A on the switch 173 make contact, the plate 2A on the control switch A is energized so that circuit is established through plate 2A, point 130, point 128 of the thermal protective relay M, coil 127 of said relay, points 126, 125 (plug 136 in), and junction 124 on the negative return wire NR. This closes the A. C. switch 133 and starts the A. C. motor 107.

The pole changer switch PC is set into the proper direction by the pole changer mechanism which turns with shaft 108, and the process of operation of the generator-motor 105 proceeds as already described.

At this time the switch on the charging relay F is closed at points 139, 140 so as to shunt out the resistance 141, thus allowing the generator to operate at full capacity.

*Résumé*

A short résumé of function is as follows:

At train speeds below 20 M. P. H., the selector control switch A is at position DC. The blower switch R is set to operate the blower motor 11. When the thermostat 12 closes, calling for cooling, the friction clutch 205 is opened, and the motor switch Q is closed to energize the motor component of the generator-motor 105.

Then the speed control 207, under action of the motor component of the generator-motor 105 slowly accelerates and finally reaches a normal driving condition for the compressor 112. The fan motor 120 at this time also starts. Under these conditions, the battery 68 drives the motor component of generator-motor 105 and the latter drives the compressor 112 through the speed control 207.

Under the above conditions, when train speeds of 20 M. P. H. or above are reached, the speed control 207 is de-energized to drop the load from the motor component of generator-motor 105.

Then the clutch 205 is closed to obtain a mechanical drive from the car axle to the compressor 112.

When the mechanical drive is in operation, the battery 68 may be charged by means of the generator component of the generator-motor 105. This occurs at speeds above 25 M. P. H., under which conditions clutch 205 is more tightly closed to assume the added load of current generation. At this time circuit conditions are such that the motor component of the generator-motor 105 is ineffective.

When the train is at large depots or terminals where A. C. power is available, the selector control switch A is placed at position AC. The blower switch R remains at a setting to operate the blower motor 11.

When the thermostat 12 closes (train stationary) clutch 205 opens. Under these conditions, the motor component of 105 receives no current whereas the motor 107 does receive A. C. current from an outside line. The clutch 205 being open, shaft 108 rotates. Coil 172 of the speed control 207 being energized, there results a drive from the A. C. motor 107 to the compressor 112. This drive is not perfected until the A. C. motor 107 has obtained its running speed.

While the compressor 112 is being driven from the A. C. motor 107 under stationary train conditions, the A. C. motor 107 is also driving the generator component of 105 to generate charging current for the battery 68. Such charging current for the battery 68 represents A. C. motive power in excess of that necessary to drive the compressor 112.

When, at a terminal, it is desired to use the full power available at the A. C. motor 107 for battery charging purposes, the manual control-switch A is set to position BAC, in which position the drive for the compressor 112 ceases to operate and the A. C. motor 107 has only to drive the generator component of generator motor 105. At this time the circuit of said generator component is arranged to have its charge-limiting resistance shunted out to allow the generator to operate at full charging capacity.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A clutch comprising a driving plate, a driven plate, spring means for normally forcing said driving plate against the driven plate with a predetermined pressure, centrifugally-responsive means adapted to force said driving plate with more pressure against the driven plate, spring means between said centrifugal means and said driving plate adapted to transmit a greater force to said driving plate than the force of said first-named spring means, and electromagnetic means adapted to pull said driving plate away from the driven plate to open the clutch.

2. A clutch comprising a driving plate, a driven plate, spring means for normally forcing said driving plate against the driven plate with a predetermined pressure, centrifugally-responsive means adapted to force said driving plate with more pressure against the driven plate, and electromagnetic means adapted to pull said driving plate away from the driven plate to open the clutch.

3. A clutch comprising a driving plate, a driven plate, spring forcing means for normally forcing said driving plate against the driven plate with a predetermined light pressure, centrifugal forcing means adapted to force said driving plate against the driven plate with more than light pressure, electromagnetic means adapted to pull said driving plate away from the driven plate to open the clutch, and a centrifugal switch responsive to the speed of the driving plate controlling the electromagnetic clutch-opening means.

4. A clutch comprising a driving plate, a driven plate, spring forcing means for normally forcing said driving plate against the driven plate with a predetermined light pressure, centrifugal forcing means adapted to force said driving plate against the driven plate with more than light pressure, electromagnetic means adapted to pull said driving plate away from the driven plate to open the clutch, and a centrifugal switch responsive to the speed of the driving plate controlling the electromagnetic clutch-opening means, said switch operating to effect clutch opening at relatively low speeds, said centrifugal forcing means closing the clutch tightly at relatively high speeds, said spring forcing means being operative automatically lightly to close the clutch over a range between said relatively high and low speeds.

5. A clutch comprising a driving plate, a driven plate, spring means for normally forcing said driving plate against the driven plate with a predetermined pressure, centrifugally-responsive means adapted to force said driving plate with more pressure against the driven plate, electromagnetic means adapted to pull said driving plate away from the driven plate to open the clutch, and means associated with the driving means adapted automatically to de-energize said electromagnetic means at predetermined low speeds, whereby said low-pressure springs become operative to close the clutch, said centrifugally-operated closing means being ineffective at said low speeds.

6. A load responsive to an intermittent demand, a direct current motor and an alternating current motor for driving the load, a multispeed clutch between the load and the direct current and alternating current motors, sources of energy for the two motors, control means for energizing the motors from the sources, control means for alternatively placing the alternating current motor or the direct current motor in driving relationship with the load through the clutch, and time delay control means for gradually loading the driving motor in response to the demand.

7. The combination of a load, a motor for driving the load, a source of energy for furnishing power to the motor, means for starting the motor with the load disengaged from the motor drive, and time-delay means responsive to the first named means for connecting the load to the motor drive after the motor is operating.

8. The combination of a load, a motor for driving the load, a source of energy for furnishing power to the motor, automatic means responding to the demand for the operation of the load for starting the motor with the load disengaged from the motor drive, and time delay means responsive to the first named means for connecting the load to the motor drive after the motor is operating.

9. An air conditioning system including a compressor, condenser, a motor driven condenser fan, an evaporator and means for driving the compressor, clutch means between the driving means and the compressor, and a control circuit including a thermostat, means responsive to the thermostat for energizing the compressor driving means, means for energizing the condenser fan motor, and means acting in time delay relationship with respect to the energization of the driving means responsive to the operation of the condenser fan motor to effect full clutching action of the clutch means so as to drive the compressor at normal operating speed.

10. A motor, a source of energy for driving the motor, a load driven by the motor in response to an intermittent demand, a multispeed clutch between the motor and the load, and control means responsive to the demand for the load for controlling the operation of the motor including fast acting means for connecting the motor to the energy source, means acting in time delay relationship with respect to the fast acting means for actuating the clutch to drive the load at low speed, and means acting in time delay relationship with respect to the slow speed operation of the clutch to actuate the clutch to drive the load at full speed.

11. The combination of a load, a motor for driving the load, a source of energy for furnishing power to the motor, means for starting the motor, and operating it with the load disengaged from the motor drive, means acting in time delay relationship with respect to the starting of the motor for connecting the load to the motor drive after the motor has been placed in operation, said last-named means effecting a driving ratio between the load and the motor of less than the normal driving ratio, and means acting in time delay relationship with respect to the first time delay means for finally increasing the driving ratio between the load and the motor to the normal operating ratio.

12. The combination of a load, a motor for driving the load, a source of energy for the motor, clutch means between the motor and the load being adapted to connect the load to the motor drive, said clutch being normally in the declutched position, and a control circuit for the motor and the clutch including a quick-make relay for starting the motor, a first clutch relay operating in time delay relationship with respect to the starting of the motor for energizing the clutch means to drive the load at slow speed, a second clutch relay for closing the circuit to energize the clutch for high speed operation of the load, and means responsive to the closing of the first clutch relay for controlling the operation of the second clutch relay by generating an electro-motive force to effect full energization of the last named relay.

13. The combination of a load, a motor for driving the load, a source of energy for the motor, clutch means between the motor and the load being adapted to connect the load to the motor drive, said clutch being normally in the declutched position, and a control circuit for the motor and the clutch including a quick-make relay for starting the motor, a first clutch relay operating in time delay relationship with respect to the starting of the motor for energizing the clutch means to drive the load at slow speed, a second clutch relay for closing the circuit to energize the clutch for high speed operation of the load, and means responsive to the closing of the first clutch relay for controlling the operation of the second clutch relay, said last named means being connected in a parallel circuit with the second clutch relay and adapted to draw a large amount of current when starting to limit energization of the second clutch relay but after a time delay being adapted to generate a counter electro-motive force to effect full energization of the second clutch relay.

14. A direct-current motor, an alternating-current motor, a load driven by said motors, a clutch between the load and the direct- and alternating-current motors, sources of energy for the two motors, control means for energizing the motors from the sources, control means for alternatively placing the direct-current motor or the alternating-current motor in driving relationship with the load through the clutch, and means acting in time-delay relationship with respect to the last-named control means for declutching the load from the driving motor prior to the starting or stopping of the motor by the first control means.

15. The combination of a load, a motor for driving the load, a source of energy for the motor, means for disconnecting the load from the motor while the motor is driving the load at normal operating speed, and time-delay means responsive to the first-named means for de-energizing the motor after the load is disconnected.

MARTIN P. WINTHER.